(12) United States Patent
Larson et al.

(10) Patent No.: US 9,748,747 B2
(45) Date of Patent: Aug. 29, 2017

(54) DISPOSABLE OPTICAL FIBER COATING REMOVAL TOOL

(71) Applicant: 3M INNOVATIVE PROPERTIES COMPANY, St. Paul, MN (US)

(72) Inventors: Donald K. Larson, Cedar Park, TX (US); William G. Allen, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 17 days.

(21) Appl. No.: 14/833,501

(22) Filed: Aug. 24, 2015

(65) Prior Publication Data

US 2016/0099553 A1 Apr. 7, 2016

Related U.S. Application Data

(60) Provisional application No. 62/058,918, filed on Oct. 2, 2014.

(51) Int. Cl.
*H02G 1/12* (2006.01)
*G02B 6/245* (2006.01)

(52) U.S. Cl.
CPC ........... *H02G 1/1214* (2013.01); *G02B 6/245* (2013.01)

(58) Field of Classification Search
CPC ...... H02G 1/1214; H02G 1/12; H02G 1/1229; G02B 6/245
USPC ....... 30/92, 91.1, 351, 241, 90.1, 90.2, 91.2, 30/346, 90.8, 90.6, 90.7, 9.41, 9.51, 9.44; 81/9.51, 9.41
See application file for complete search history.

(56) References Cited

U.S. PATENT DOCUMENTS

| 1,065,679 | A | * | 6/1913 | Gregson et al. | H02G 1/1214 30/173 |
| D152,374 | S | * | 1/1949 | Score | D8/56 |
| 3,151,510 | A | * | 10/1964 | Bunker | H02G 1/1295 30/90.6 |
| 3,530,575 | A | * | 9/1970 | Riche | H02G 1/1214 30/91.2 |
| 3,796,115 | A | * | 3/1974 | Dane | H02G 1/1214 30/91.2 |
| 4,184,389 | A | * | 1/1980 | Dvorak | H02G 1/1214 30/90.1 |

(Continued)

FOREIGN PATENT DOCUMENTS

| CN | 101943780 | 1/2011 |
| CN | 202583509 | 12/2012 |

(Continued)

OTHER PUBLICATIONS

International Search Report for PCT/US2015/046507, mailed on Nov. 20, 2015, 3 pp.

*Primary Examiner* — Ghassem Alie
(74) *Attorney, Agent, or Firm* — Janet A. Kling

(57) ABSTRACT

A device to strip the external coating layer off of a coated optical fiber is provided. The optical fiber coating removal device includes a one piece molded body having a first body portion connected to a second body portion by a flexible region and a blade secured in one of the first body portion and the second body portion wherein the blade includes a U-shaped slot having cutting edges on the inside of the slot, wherein the flexible portion allows the first and second body portions to move between an open state and a closed state for stripping an optical fiber.

11 Claims, 14 Drawing Sheets

(56) References Cited

U.S. PATENT DOCUMENTS

| | | | | |
|---|---|---|---|---|
| 5,062,192 | A | * | 11/1991 | Sawyer ................ H02G 1/1229 29/426.4 |
| 5,414,931 | A | * | 5/1995 | Wollermann .......... H02G 1/127 30/241 |
| 6,509,547 | B1 | | 1/2003 | Bernstein |
| 8,677,861 | B2 | | 3/2014 | de Jong |
| 8,875,403 | B2 | | 11/2014 | Yamaguchi |
| 2004/0181945 | A1 | | 9/2004 | Shiraishi et al. |
| 2011/0204117 | A1 | | 8/2011 | Barnes |
| 2011/0308358 | A1 | | 12/2011 | Iwashita et al. |
| 2012/0247301 | A1 | | 10/2012 | De Jong et al. |
| 2013/0247728 | A1 | | 9/2013 | Sekine |
| 2014/0124140 | A1 | | 5/2014 | Verheyden et al. |
| 2014/0299645 | A1 | | 10/2014 | Lurie |

FOREIGN PATENT DOCUMENTS

| | | |
|---|---|---|
| CN | 202676943 | 1/2013 |
| CN | 103149634 | 6/2013 |
| CN | 103257400 | 8/2013 |
| CN | 203385892 | 1/2014 |
| CN | 204314503 | 5/2015 |
| DE | 102008046826 | 1/2010 |
| EP | 0715193 | 6/1996 |
| EP | 0990929 | 4/2000 |
| JP | 2004-163688 | 6/2004 |
| JP | 2014-182336 | 9/2014 |
| JP | 2015-102616 | 6/2015 |

* cited by examiner

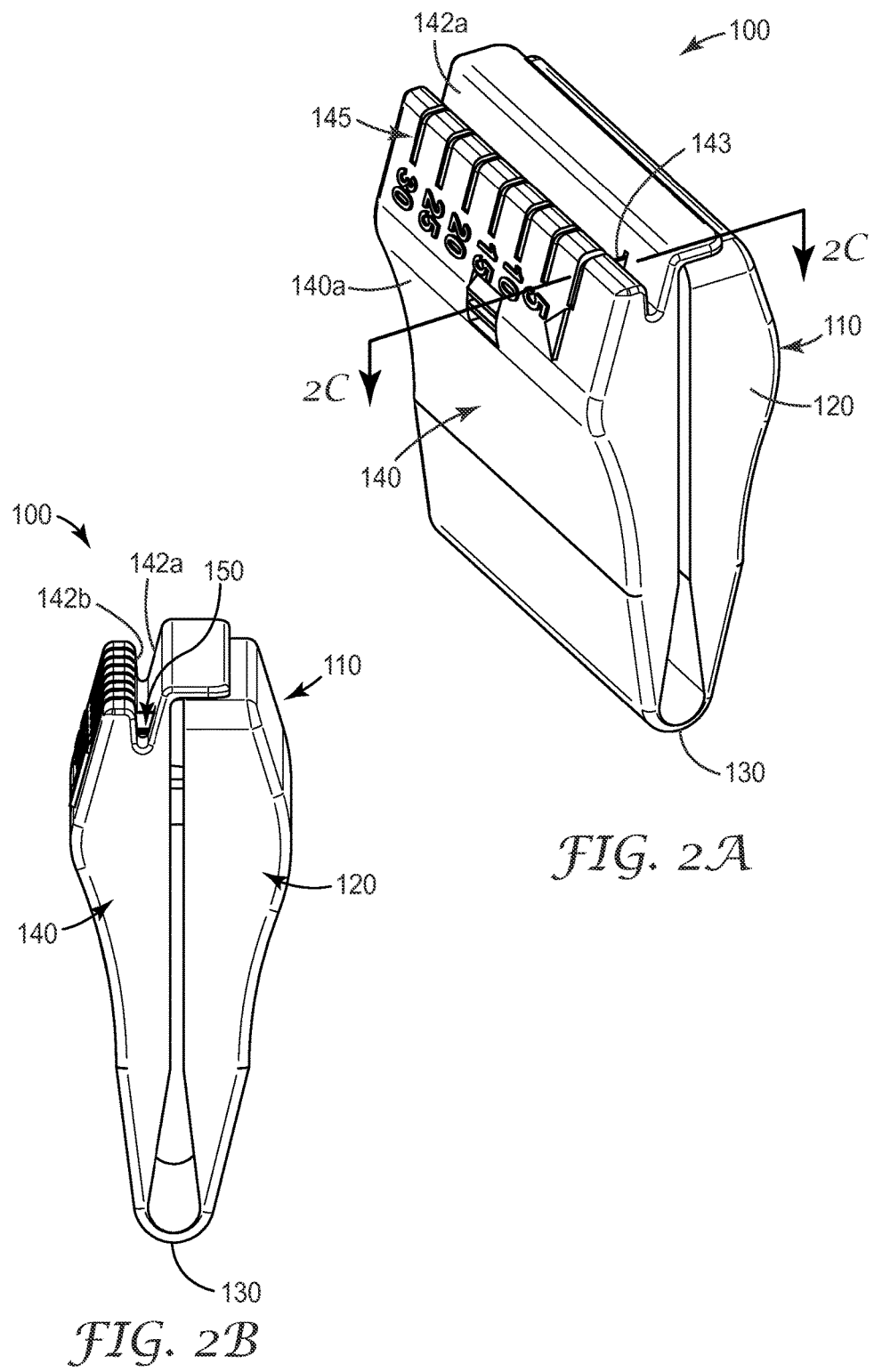

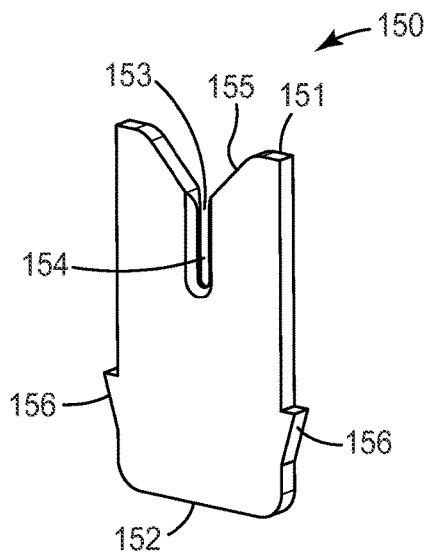
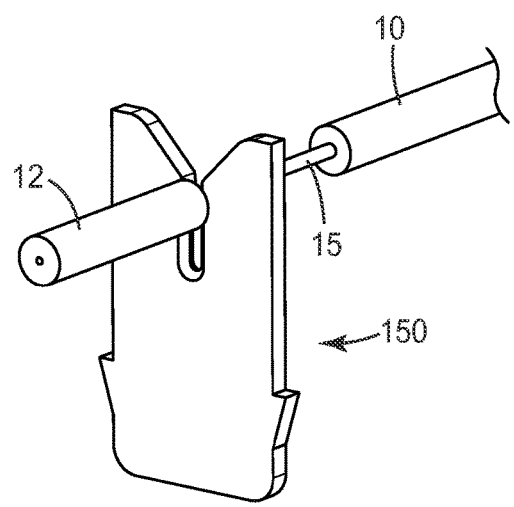
FIG. 4A    FIG. 4B
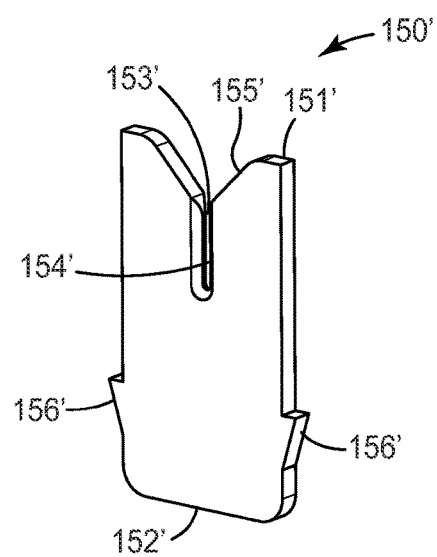
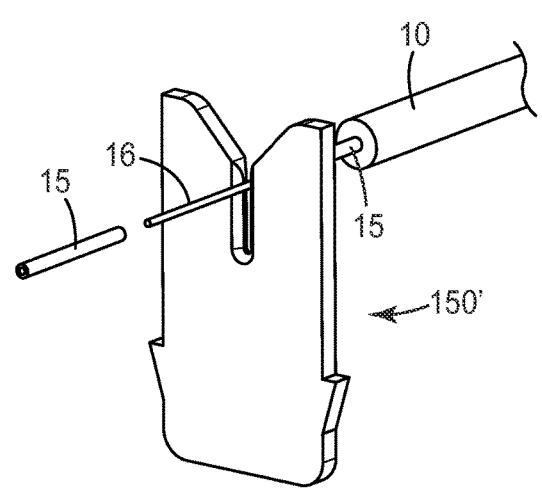
FIG. 5A    FIG. 5B

DISPOSABLE OPTICAL FIBER COATING REMOVAL TOOL

BACKGROUND OF THE INVENTION

Field of the Invention

The present invention is directed to a simplified device for removing one or more exterior coatings from a coated optical fiber.

Background

Optical fiber coating removal tools are well known in the industry. Traditional optical fiber coating removal tools are designed as an extension of copper wire insulation stripping tools. Alternatively, more advanced technologies such as heat assisted optical fiber coating tools, laser ablation, and sulfuric acid are also used to strip coatings from optical fibers, but due to the complicated nature and potential hazards associated with these advanced coating removal technologies, they are only practiced in a factory setting where a power source is accessible and appropriate safety precautions can be made.

The industry accepted field optical fiber coating removal tool, (also referred herein and a field stripping tool) is based on wire stripping technology. Usually, these field stripping tools resemble a pair of pliers. To use this type of accepted field optical fiber coating removal tool, the plier's handles are squeezed, to bring together two opposing v-grooved blades disposed on the opposite end of the tool around a piece of coated optical fiber. These blades result in a closed diamond shape around the fiber. Pulling the tool toward the free end of the optical fiber removes the coating surrounding the glass fiber. Alternatively blade geometries are also known such as opposing u-shaped grooves, or opposing flat blades. In some cases, these tools can pre-heat the coating to reduce the coating axial removal forces.

As a final step in the manufacturing process for these field stripping tools, a set screw is adjusted to optimize the closed position. This opening is set to ensure the coating is cut, yet minimize contact with the bare glass.

By design, the wire-based field stripping tools have some inherent risk when being used with optical fibers. After a period of use, these wire-based field stripping tools can become worn, damaged, or misadjusted, and the optical fiber being stripped may be damaged. For example, the glass of the optical fiber may be scratched creating a risk for the long term durability of the optical fiber.

Variability on the results of the coating removal can be impacted by the skill and technique used by the craft. The craft must develop a feel for the specific personality of a given field stripping tool. In addition the craft may vary the applied hand squeeze force, or tip the tool to aid in removing the coating from the optical fiber, which can cause the strip opening size to change and can result in the coating not being removed from the optical fiber or can lead to damage or scratching of the glass. In addition, wear of the cutting edges changes the fiber strip dynamics which can lead to inconsistencies in strip performance.

In addition, these tools can be costly to replace on a regular basis. Thus, there is a need in the industry for a simple and reliable low cost field stripping tool that does not require a power supply to be used and that can be replaced regularly to ensure reliable stripping performance.

SUMMARY

According to an exemplary embodiment of the present invention, a device to strip the coating off of an optical fiber is provided. The optical fiber coating removal device includes a one piece molded body having a first body portion connected to a second body portion by a flexible region and a blade secured in one of the first body portion and the second body portion wherein the blade includes a U-shaped slot having cutting edges on the inside of the slot, wherein the flexible portion allows the first and second body portions to move between an open state and a closed state for stripping an optical fiber.

In an alternative embodiment, an exemplary optical fiber coating removal device can be incorporated into the base of other tooling used to terminate optical fibers, wherein the optical fiber coating removal device includes a one piece molded body having a first body portion connected to a second body portion by a flexible region and a blade secured in one of the first body portion and the second body portion wherein the blade includes a U-shaped slot having cutting edges on the inside of the slot, wherein the flexible portion allows the first and second body portions to move between an open state and a closed state for stripping an optical fiber.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIGS. 2A-2E are five additional views of the exemplary optical fiber coating removal tool of FIGS. 1A-1E.

FIGS. 4A-4B are two views of an exemplary blade usable in the optical fiber coating removal tool according to an aspect of the invention.

FIGS. 5A-5B are two views of an alternative exemplary blade usable in the optical fiber coating removal tool according to an aspect of the invention.

Figure 1A:
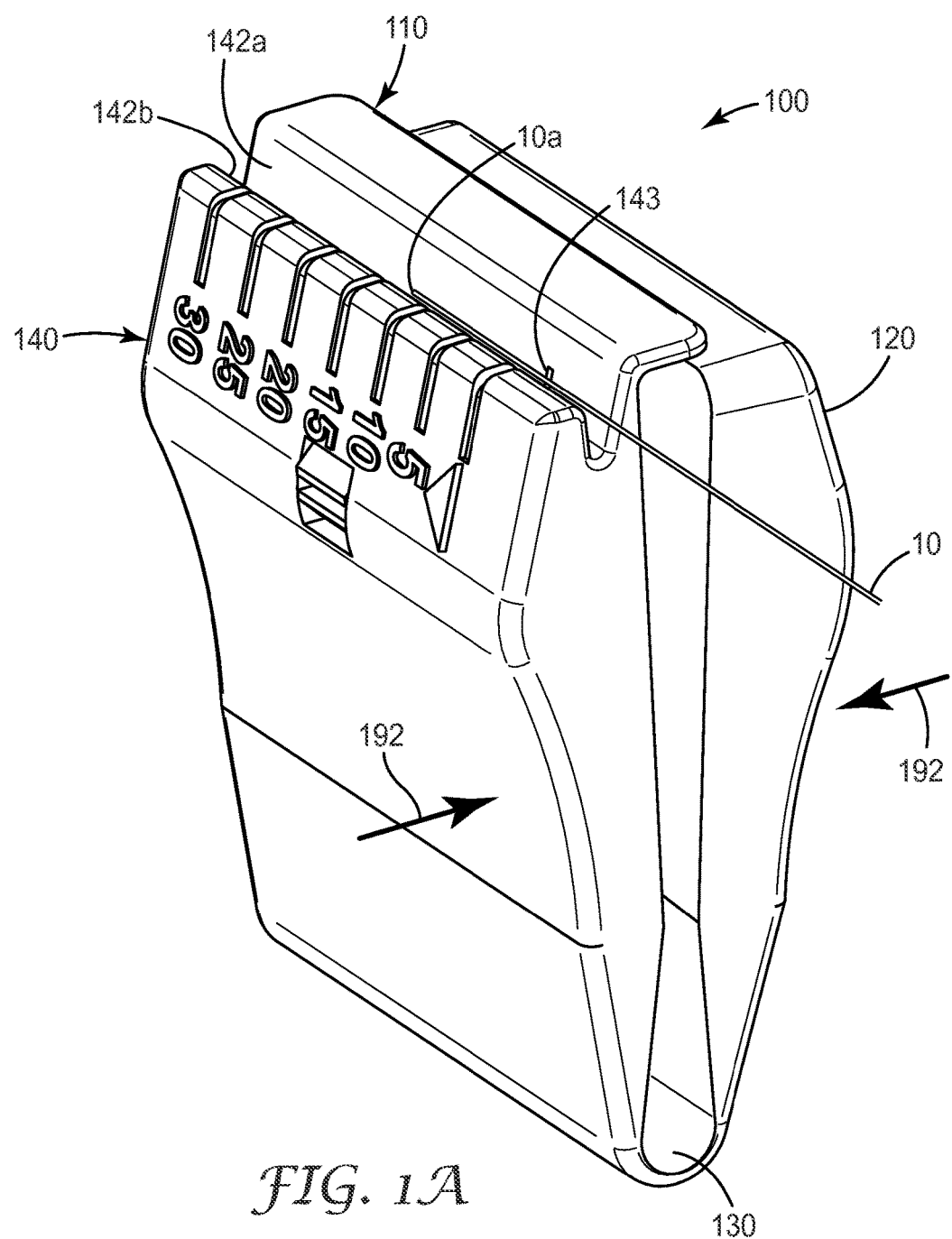
FIGS. 1A-1E are five views of an exemplary optical fiber coating removal tool according to an aspect of the invention.
Figure 1B:
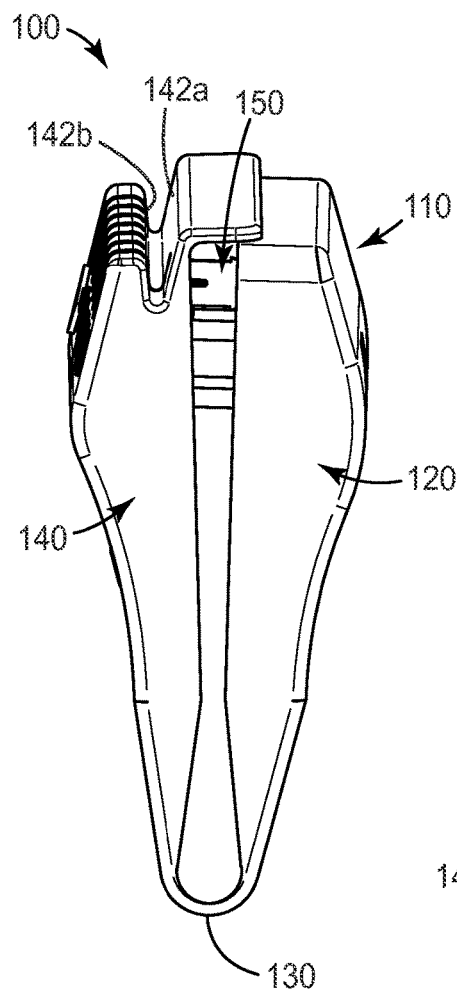
Figure 1C:
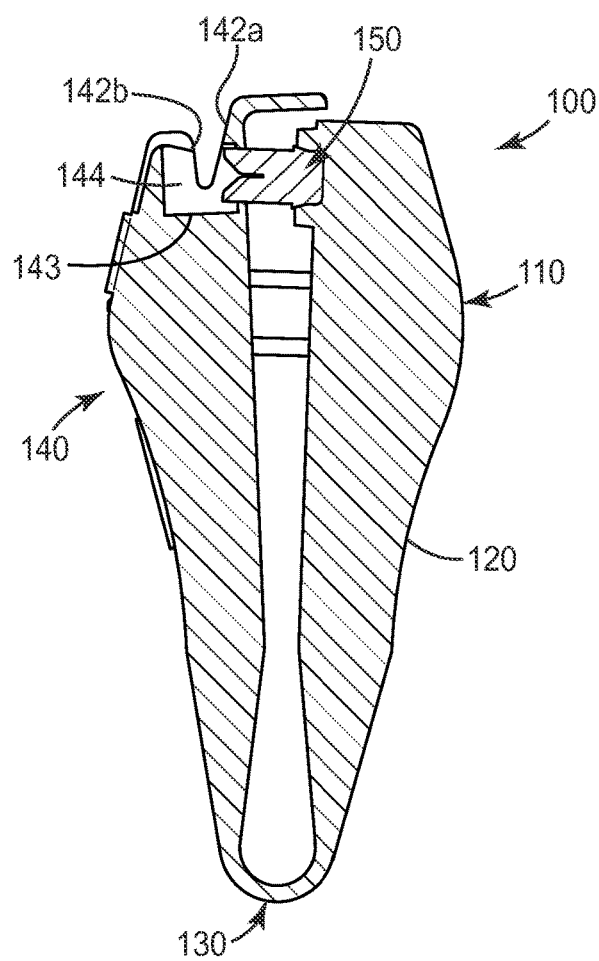
Figure 1D:
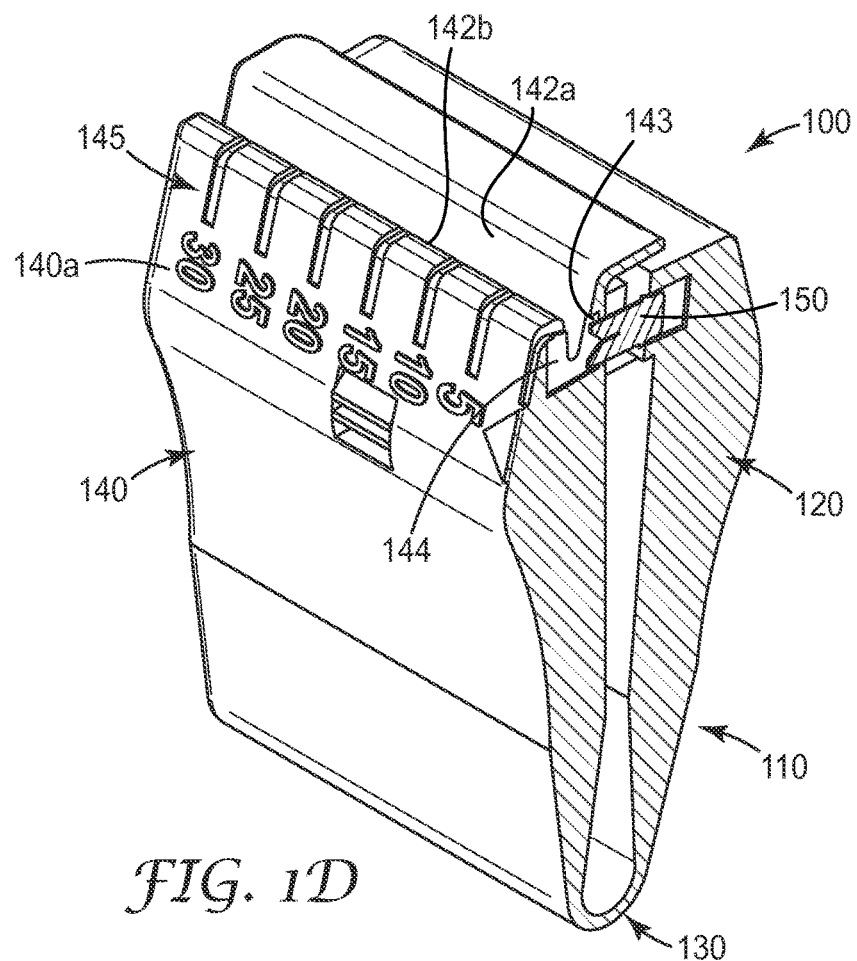
Figure 1E:
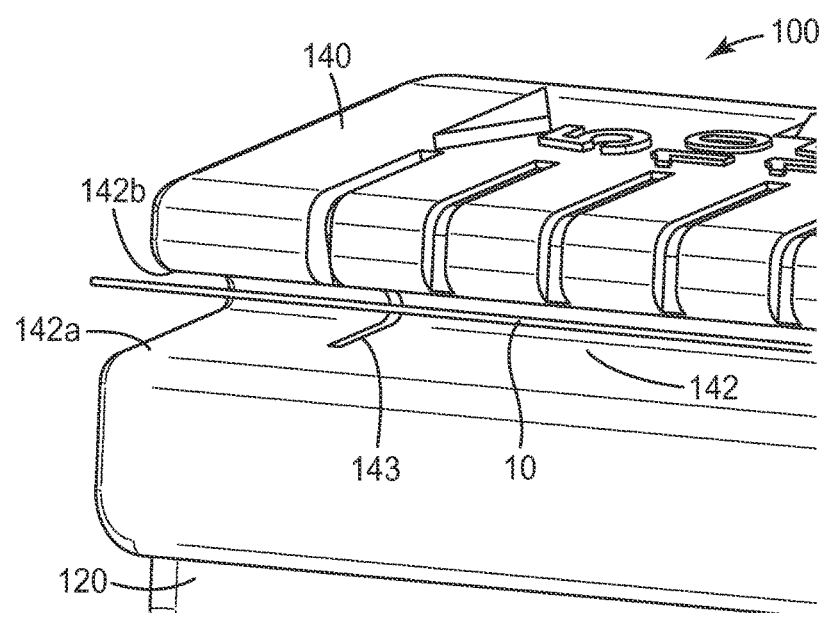
Figure 2C:
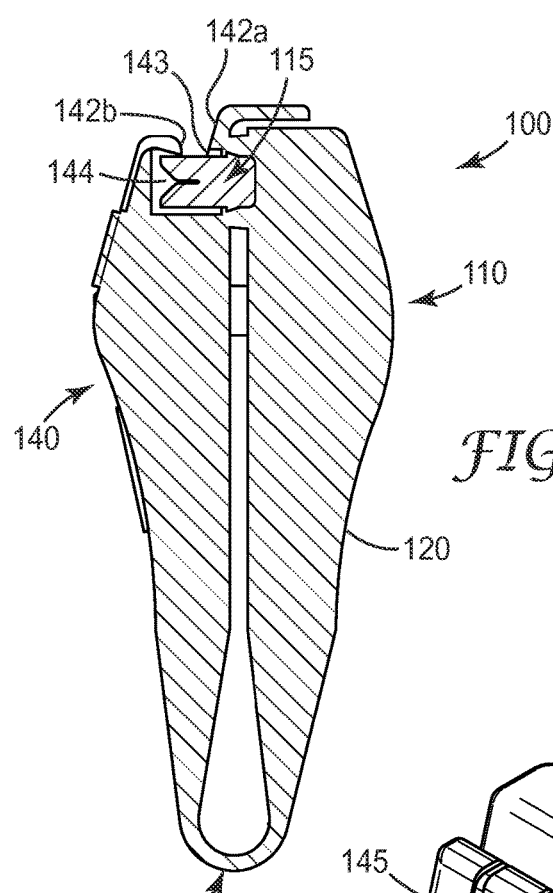
Figure 2D:
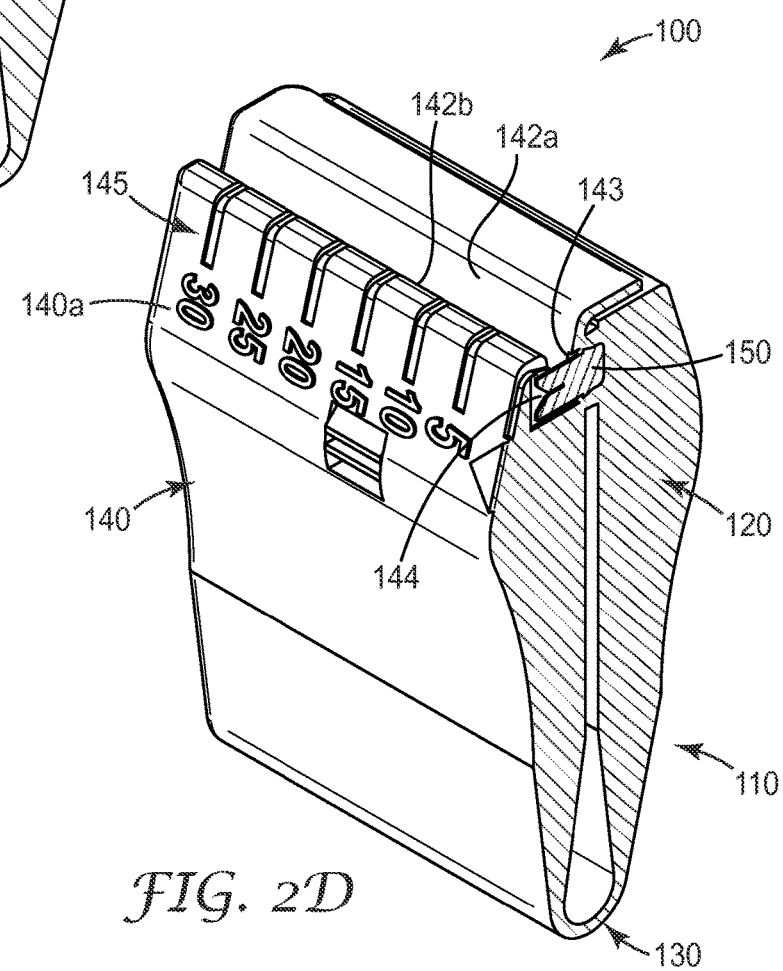
Figure 2E:
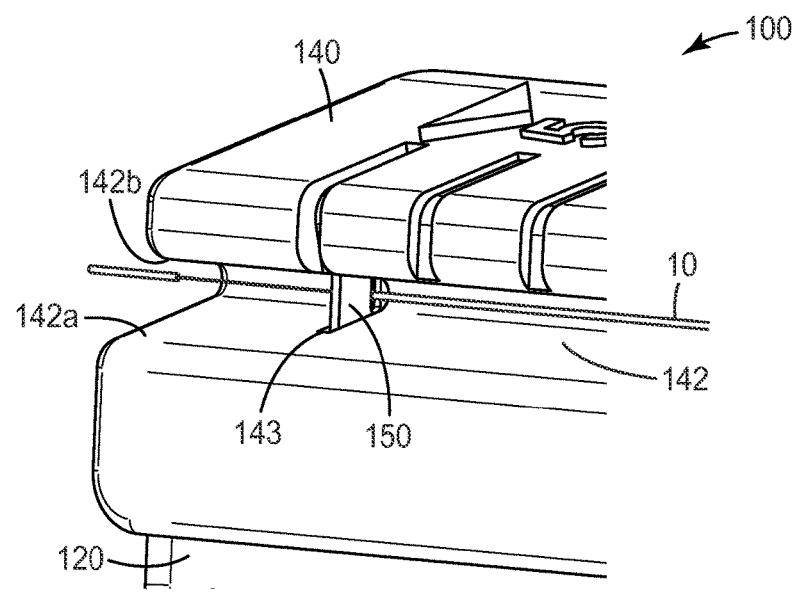

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

FIGS. 1A-1E and 2A-2E show several views of an exemplary optical fiber coating removal tool 100 according to an aspect of the invention. Specifically, FIGS. 1A-1E show the exemplary optical fiber coating removal tool 100 in an open state and FIGS. 2A-2E show the exemplary optical fiber coating removal tool in a closed state for stripping the exterior protective coating from a coated optical fiber 10.

Optical fiber coating removal device or tool 100 includes a one piece molded body 110 having a first body portion 120 connected to a second body portion 140 by a flexible portion 130, and a first metal blade 150 secured in the first body portion. The flexible portion allows the first and second body portions to move between an open state and a closed state for stripping the exterior protective coating from an optical fiber. In an exemplary aspect, the flexible portion 130 can be a living hinge.

Device 100 can further include a fiber guide channel 142 formed in the second body portion 140, wherein the fiber guide channel has a first channel wall 142a and a second channel wall 142b disposed opposite the first channel wall. The terminal end of coated optical fiber 10 can be laid in the fiber guide channel as shown in FIG. 1A. The first and second channel walls can be sloped to create a substantially V-shaped fiber guide channel that can facilitate placement of the coated optical fiber in the optical fiber coating removal device. In an exemplary aspect, the angle between the first and second channel wall can be less than about 30°, preferably less than about 20°.

The second body portion 140 can have a blade access slot 143 through the first channel wall 142a and oriented orthogonal to the fiber guide channel 142 through which the blade can extend when the optical fiber coating removal device is actuated to enable removal of the exterior protective coating from the terminal end of the coated optical fiber and a blade counter sink slot 144 formed in the second channel wall 142b and aligned with the fiber access slot to provide the correct positioning of the blade during the coating removal process. The optical fiber coating removal device is actuated by squeezing the first body portion toward the second body portion as indicated by arrows 192 in FIG. 1A.

In an exemplary aspect, the second body portion 140 can further include strip length indicator 145 disposed on the outer surface 140a of the second body portion adjacent to the fiber guide channel to aid in removing the appropriate amount of coating material from a terminal end 10a of a coated optical fiber. In one aspect, the strip length indicator can be printed on the outer surface of the second body portion, while in an alternative aspect the strip length indicator can be molded into the outer surface of the second body portion when the body of the optical fiber coating removal device is formed. The terminal end 10a of the coated optical fiber 10 is placed in the fiber guide channel 142 at the mark that corresponds to the desired amount of coating to be removed. The device is actuated by squeezing the first body portion toward the second body portion to cause the blade to engage with the coated optical fiber, then the optical fiber coating removal device is moved axially down the coated optical fiber toward and beyond the terminal end of the coated optical fiber pushing the exterior coating off of the coated optical fiber.

For example, the terminal end 10a of the coated optical fiber 10, shown in FIG. 1A resides in the fiber guide channel 142 adjacent to the 20 mm mark. Thus, when the exemplary optical coating removal device is actuated by squeezing the first body portion toward the second body portion (in a direction indicated by directional arrows 192) and moved axially down the coated optical fiber toward and beyond the terminal end of the coated optical fiber, approximately 20 mm of the outer coating layer will be removed.

FIGS. 4A and 5A show two close-up views of exemplary metal blades 150, 150', respectively, that can be used in the optical fiber coating removal device of the current invention. Each blade 150, 150' has a generally rectangular shape having a first end 151, 151' and a second end 152, 152'. The first end of each of the blades includes a first U-shaped 153, 153' slot having cutting edges 154, 154' on the inside edge of the slot that can displace the external coating layer from the terminal end of a coated optical fiber as described previously. In an exemplary aspect, the upper or open ends first U-shaped slots have a funnel portion 155, 155' to aid in guiding the coated optical fiber into the first U-shaped slots. In another aspect, the cutting edges 154, 154' on the inside edge of the first U-shaped slot can be beveled from a first thickness to a second thickness, wherein the first thickness is greater than the second thickness. This beveling of the cutting edges provides a sharper edge for removing the external coating layer from a coated optical fiber.

Figure 3:
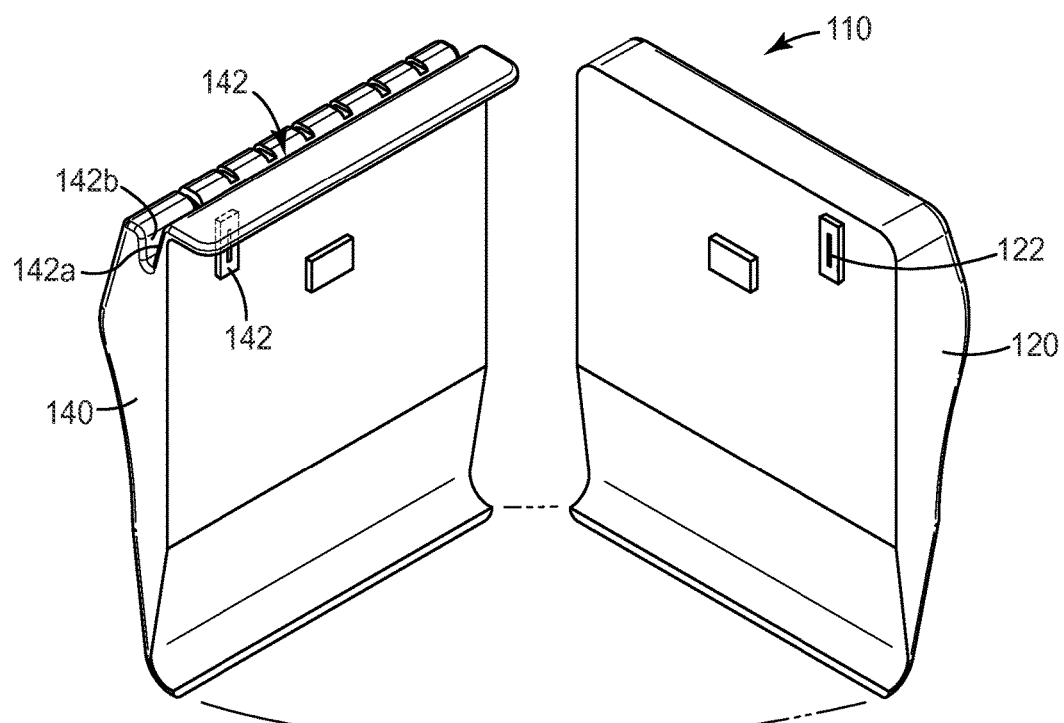
FIG. 3 is a bisected isometric view of the exemplary optical fiber coating removal tool of FIGS. 1A-1E.

In an exemplary aspect, blade 150, 150' can have a barb 156, 156' located along each longitudinal edge of the blade 150, 150' to anchor the blade in the first body portion of the exemplary optical fiber coating removal device. In one aspect, the blades can be added to the fiber coating removal device through a conventional insert molding process. In an alternative aspect, the blades can be press fit into an opening in the first body portion, for example opening 122 disposed in the inside surface of the first body portion as shown in FIG. 3, of the fiber coating removal device after the body is formed.

The blades 150, 150' can be made of a metal material. In one exemplary embodiment, the blades 150, 150' may be constructed of phosphor bronze alloy C521000 per ASTM B103/103M-98e2 with reflowed matte tin plating of 0.000150-0.000300 inches thick, per ASTM B545-97(2004) e2 and electrodeposited nickel underplating, 0.000050 inches thick minimum, per SAE-AMS-QQ-N-290 (July 2000) and can be produced by a simple metal stamping process.

There are specific geometrical guidelines for most conventional coated optical fibers. For example, the glass of the optical fiber generally has a cross-sectional diameter from about 120 microns to about 125 microns comprising the core and the cladding of the optical fiber. The glass portion of the optical fiber can be coated with one or more polymer coating layers. The polymer coating layers help to protect the glass, but must be removed in order to terminate an optical fiber in either an optical connector or an optical splice. The first or primary polymer coating layer 15 (FIG. 5B) can increase the cross-sectional diameter of the coated optical fiber to about 250 microns. One or more additional polymer coating layers can be applied on top of the primary polymer coating layer to increase cross-sectional diameter to about 900 microns (another standard diameter of a coated optical fiber). In an exemplary aspect, FIG. 4B shows the use of blade 150 to remove the 900 micron coating 12 from the coated optical fiber 10 leaving the primary coating layer 15 intact over the glass portion of the fiber. FIG. 5B shows the use of blade 150' to remove the 250 micron primary coating layer 15 from the coated optical fiber 10 leaving the glass portion 16 of the coated optical fiber exposed.

The width of the U-shaped slots in blades 150, 150' determine which coating layer can be removed. For example, blade 150 can have a U-shaped slot width of about 300 microns which can be used to remove the 900 micron coating while leaving the 250 micron coating intact as shown in FIG. 4B. In an alternative aspect, blade 150' can have a U-shaped slot width of about 165 microns, which can be used to remove the 250 micron coating without marring or damaging the bare glass of the optical fiber, as shown in FIG. 5B.

In an alternative embodiment, the optical fiber coating removal device can include a second metal blade disposed in the first body portion adjacent to the first blade wherein the second blade comprises a second U-shaped slot having cutting edges on the inside of the slot, wherein the first U-shaped slot is characterized by a first width and the second U-shaped slot is characterized by a second width. In this configuration, the exemplary optical fiber coating removal device will be able to remove a plurality of different polymer coating layers from the terminal end of a coated optical fiber.

Figure 6A:
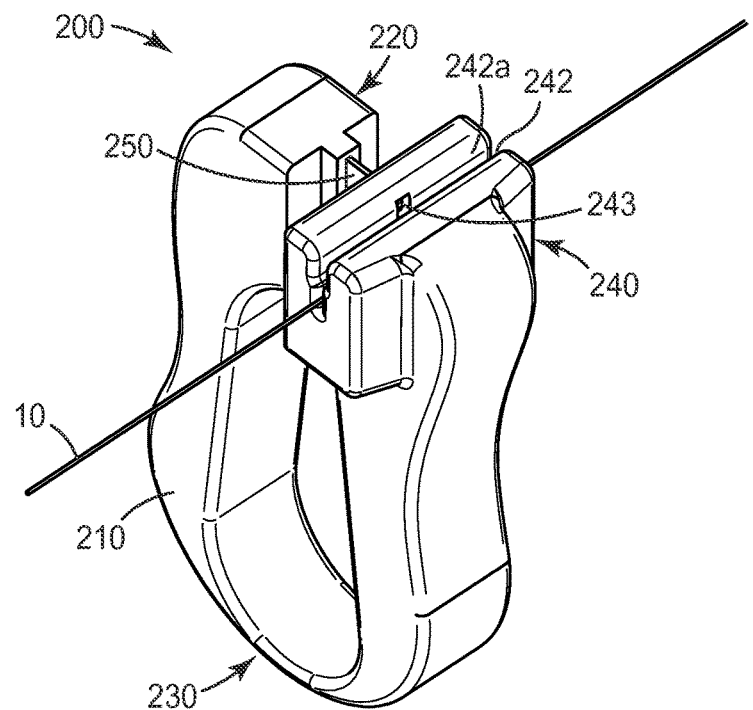
FIGS. 6A-6F are six views of an alternative exemplary optical fiber coating removal tool according to an aspect of the invention.
Figure 6B:
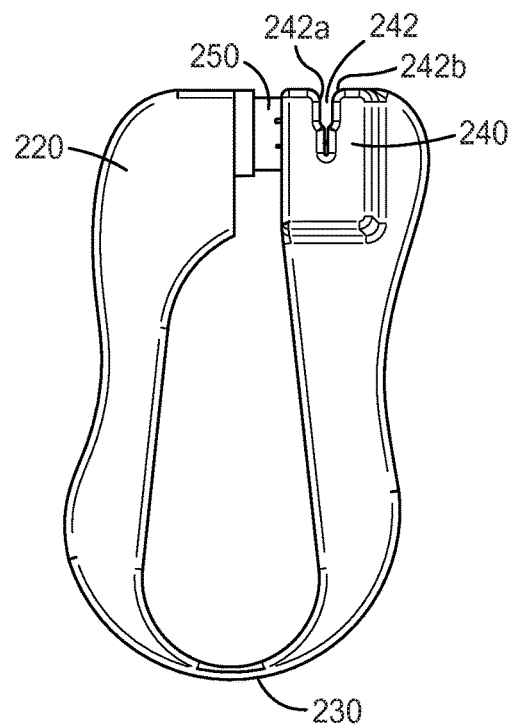
Figure 6C:
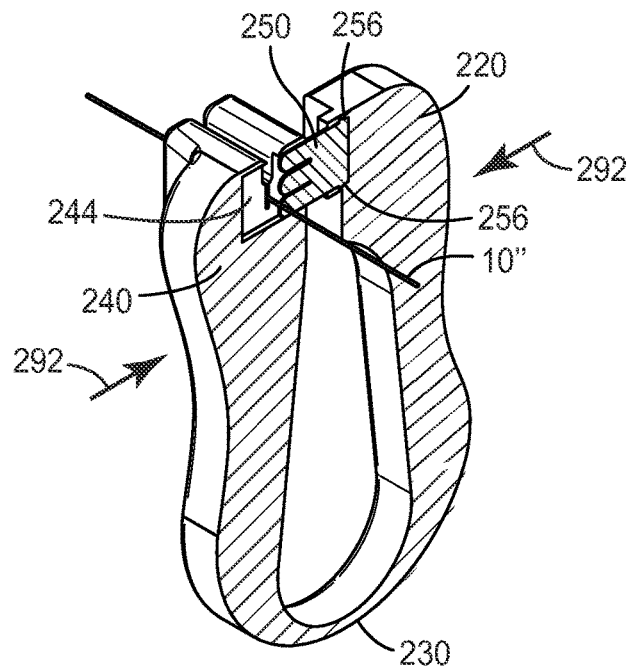
Figure 6D:
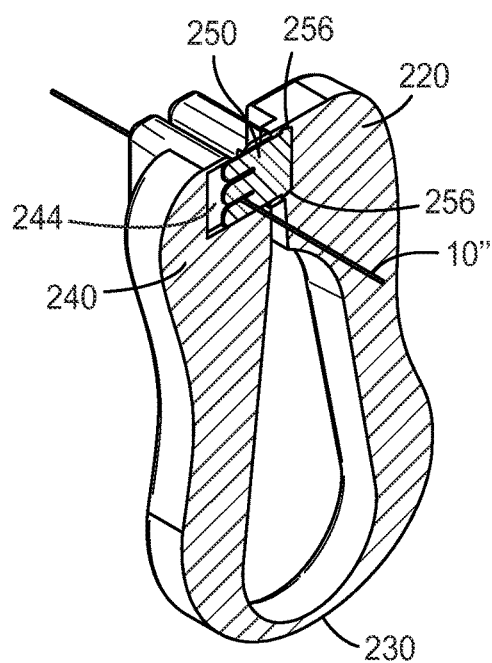
Figure 6E:
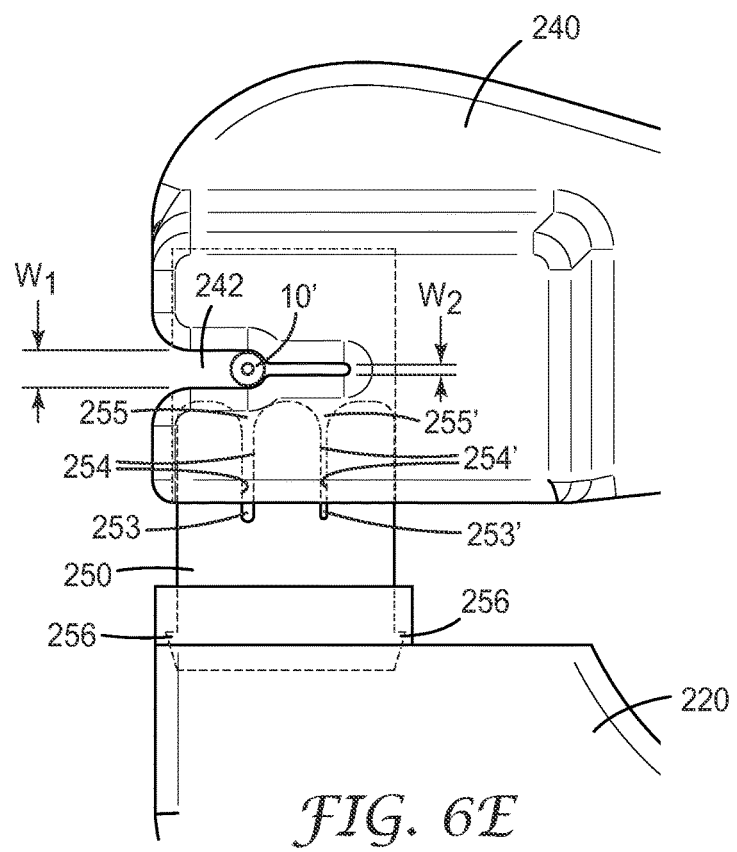
Figure 6F:
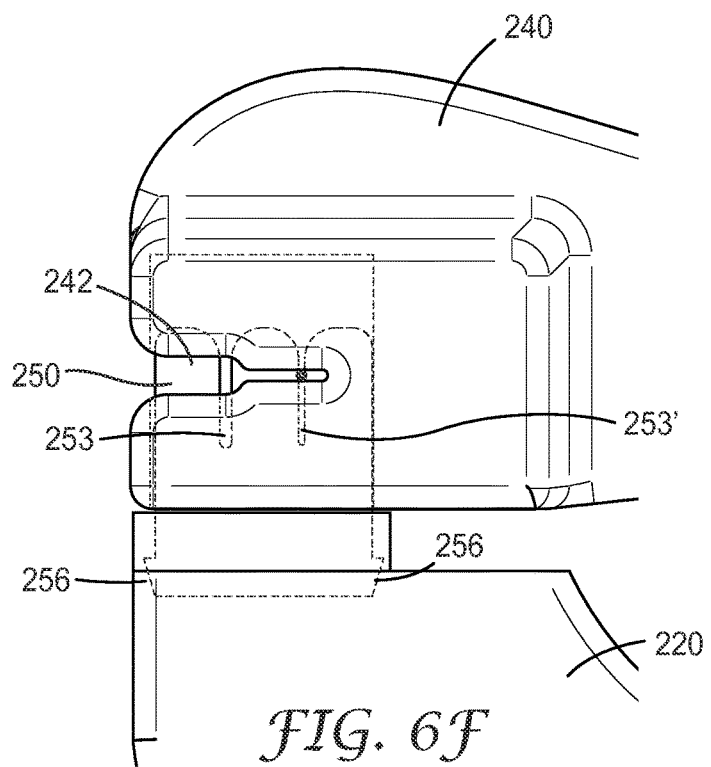

FIGS. 6A-6F show several views of another embodiment of an exemplary optical fiber coating removal device 200 according to an aspect of the invention. FIG. 6A is an isometric view of coating removal device 200 in an open position, while FIG. 6B is a side view of coating removal device 200 in the same position. FIGS. 6C and 6D are sectional views of device 200 in an open position and a closed position, respectively. FIG. 6E shows the removal of the 900 micron coating from a coated optical fiber using device 200, while FIG. 6F shows the removal of the 250 micron coating from a coated optical fiber using device 200.

Optical fiber coating removal device 200 includes a one piece molded body 210 having a first body portion 220 connected to a second body 240 portion by a flexible region 230, and a first metal blade 250 secured in the first body portion. The flexible portion can serve as a handle and allows the first and second body portions to move between an open state and a closed state for stripping the exterior protective coating from an optical fiber.

Device 200 can further include a fiber guide channel 242 formed in the second body portion 240, wherein the fiber guide channel has a first channel wall 242a and a second channel wall 242b disposed opposite the first channel wall. The terminal end of coated optical fiber 10 can be laid in the fiber guide channel as shown in FIG. 1A. The first and second channel walls can have a stepped configuration so that the fiber guide channel is wider at the top of the channel and narrower at the bottom of the channel. Thus the fiber guide channel is characterized by a first channel width $W_1$ near the top of the channel and a second channel width $W_2$ near the bottom of the channel. For example, the first channel width $W_1$ can be about 1.0 mm which is sufficient to accommodate a 900 micron coated optical fiber while the second channel width $W_2$ can be narrower having a width of about 300 microns to accommodate a 250 micron coated optical fiber. In an exemplary aspect, the channel walls in this exemplary embodiment are substantially vertical, having only a few degrees of draft to aid in molding the one piece molded body.

The dual width fiber guide channel with the stepped sidewalls allows the use of a stripping blade 250 having a first U-shaped slot 253 and a second U-shaped slot 253'. Each of U-shaped slots 253, 253' includes cutting edges 254, 254', respectively, on the inside edge of the slots that can displace the external coating layer from the terminal end of a coated optical fiber as described previously. In an exemplary aspect, the upper or open ends of first and second U-shaped slots have a funnel portion 255, 255' to aid in guiding the coated optical fiber into the U-shaped slots. In another aspect, the cutting edges 254, 254' on the inside edge of the U-shaped slots can be beveled from a first thickness to a second thickness, wherein the first thickness is greater than the second thickness. This beveling of the cutting edges provides a sharper edge for removing the external coating layer from a coated optical fiber.

In an exemplary aspect, blade 250 can have a barb 256 located along each longitudinal edge of the blade 250 to anchor the blade in the first body portion of optical fiber coating removal device 200. In one aspect, the blade can be added to the fiber coating removal device through a conventional insert molding process. In an alternative aspect, blade 250 can be press fit into an opening in the first body portion 220 after the body is formed.

As before, blades 250 can be made of a metal material and can be produced by a simple metal stamping process.

The width of the U-shaped slots 253, 253' in blade 250 determine which coating layer can be removed. For example, blade 250 can have a first U-shaped slot width of about 1 mm, which can be used to remove the 900 micron coating while leaving the 250 micron coating intact and a second U-shaped slot width of about 300 microns, which can be used to remove the 250 micron coating without marring or damaging the bare glass of the optical fiber, as shown in FIGS. 6E and 6F.

In an alternative embodiment, the optical fiber coating removal device can include a two metal blades disposed side-by side, wherein the first blade has a first u-shaped slot having cutting edges on the inside of the slot and having a first width and a second blade having a second U-shaped slot having cutting edges on the inside of the slot and having a second slot width. In this configuration, the exemplary optical fiber coating removal device will be able to remove a plurality of different polymer coating layers from the terminal end of a coated optical fiber.

The second body portion 240 can have a blade access slot 243 through the first channel wall 242a and oriented orthogonal to the fiber guide channel 242 through which the blade can extend when the optical fiber coating removal device is actuated to enable removal of the exterior protective coating from the terminal end of the coated optical fiber and a blade counter sink slot 244 formed in the second channel wall 242b and aligned with the fiber access slot to provide the correct positioning of the blade during the coating removal process. The optical fiber coating removal device is actuated by squeezing the first body portion toward the second body portion as indicated by arrows 292 in FIG. 6C.

In an exemplary aspect, the second body portion 240 can further include strip length indicator (not shown) disposed on the outer surface of the second body portion adjacent to the fiber guide channel to aid in removing the appropriate amount of coating material from a terminal end of a coated optical fiber. In one aspect, the strip length indicator can be printed on the outer surface of the second body portion, while in an alternative aspect the strip length indicator can be molded into the outer surface of the second body portion when the body of the optical fiber coating removal device is formed. The terminal end of the coated optical fiber is placed in the fiber guide channel 242 at the mark that corresponds to the desired amount of coating to be removed. The device is actuated by squeezing the first body portion toward the second body portion to cause the blade to engage with the coated optical fiber, then the optical fiber coating removal device is moved axially down the coated optical fiber toward and beyond the terminal end of the coated optical fiber pushing the exterior coating off of the coated optical fiber.

Figure 7A:
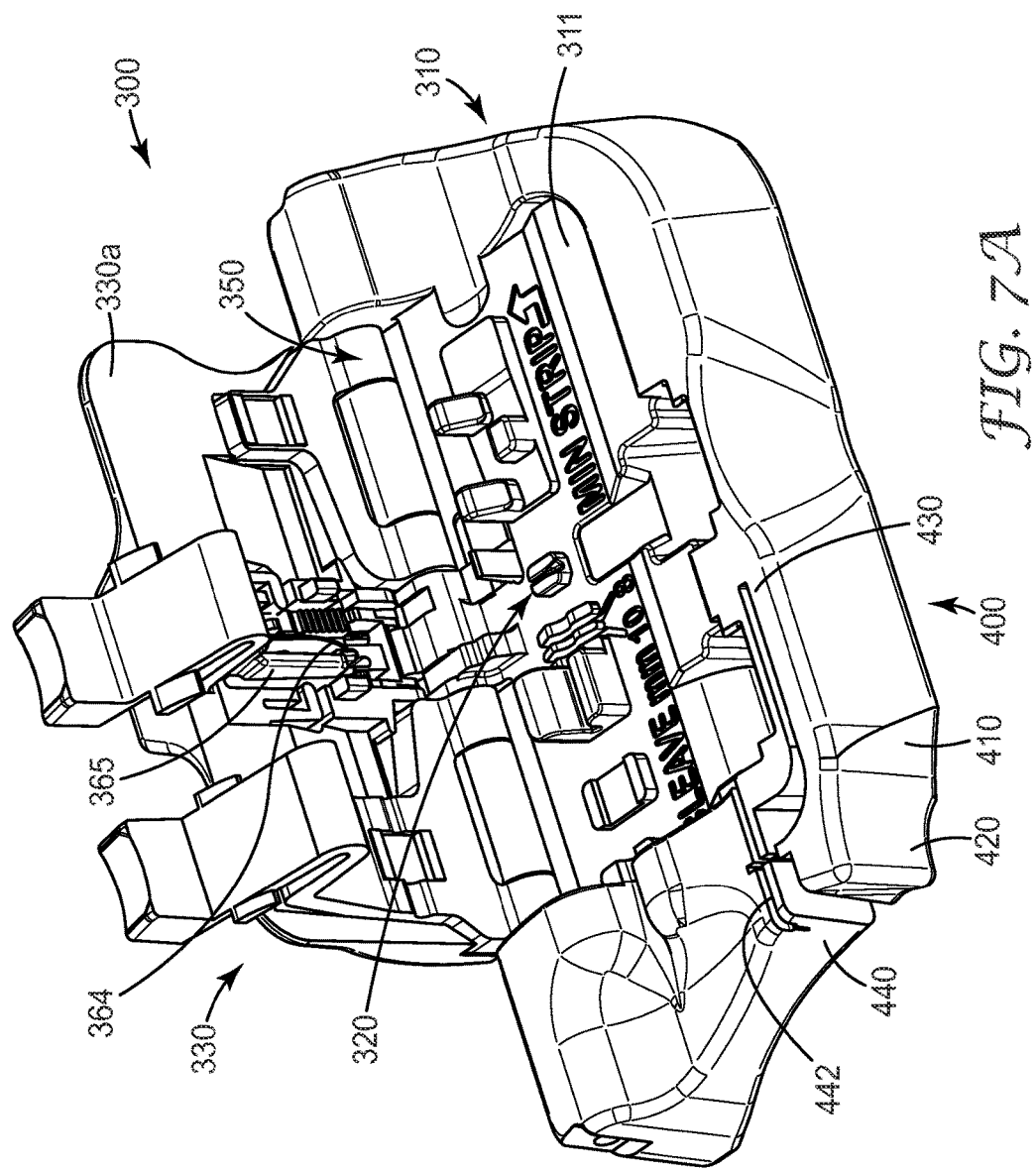
FIGS. 7A-7F are six views of another alternative exemplary optical fiber coating removal tool according to an aspect of the invention.
Figure 7B:
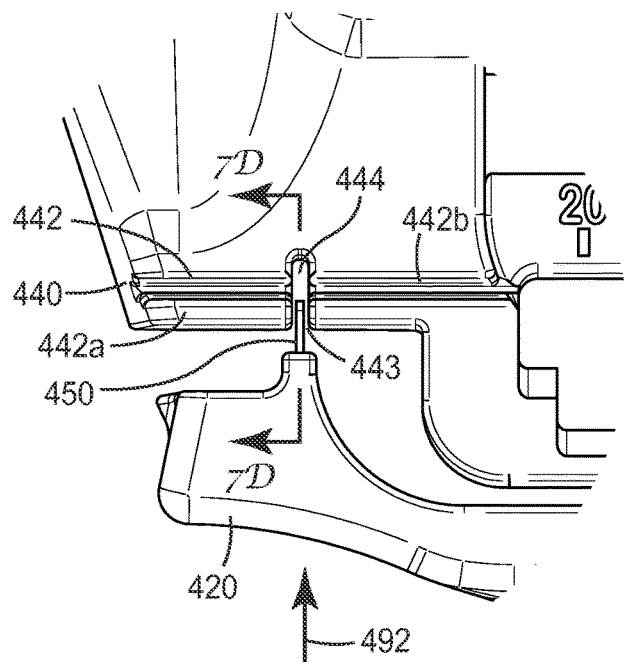
Figure 7C:
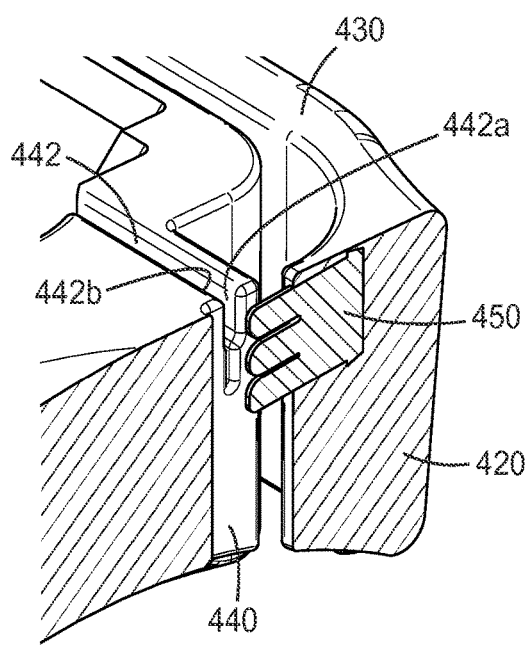
Figure 7D:
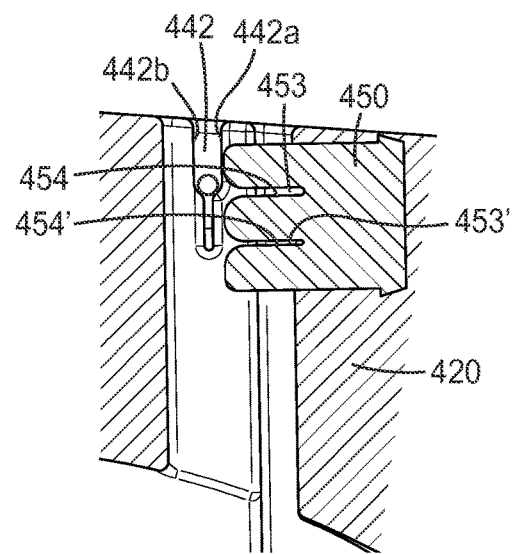
Figure 7E:
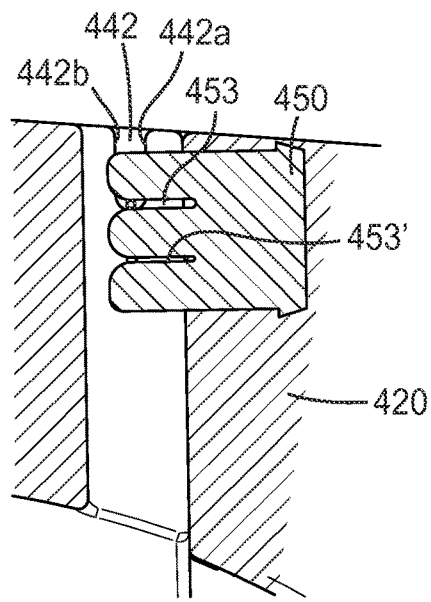
Figure 7F:
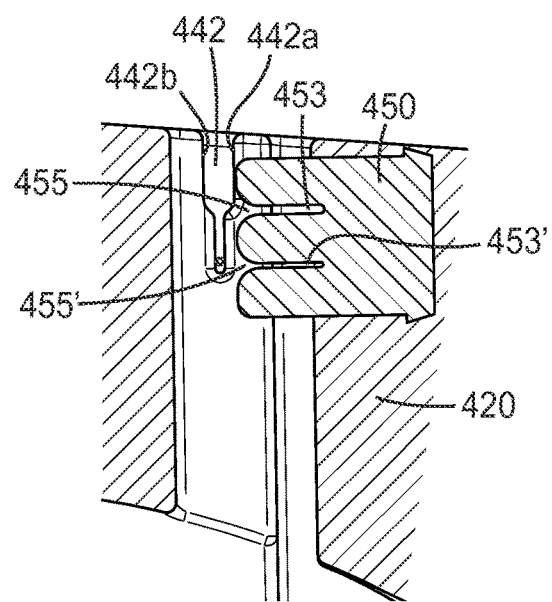

In an exemplary aspect, the exemplary optical fiber coating removal device of the current invention can be incorporated into other types of tooling used to terminate optical fibers. For example, FIGS. 7A-7F show several views of another embodiment of an exemplary optical fiber coating removal device 300 which has been incorporated into the base of an exemplary optical fiber cleaving device such as the optical fiber cleaving device described in United States Publication No. 2014-0299645, incorporated herein by reference. FIG. 7A is an isometric view of optical fiber cleaving device 300 having an exemplary coating removal device 400 disposed therein, while FIG. 7B is a top detail view of coating removal device 400 which is disposed in the base of optical fiber cleaving device 300. FIG. 7D is a cross sectional view and 7C is a sectional view of device 400 in an open position, respectively. FIG. 7E shows device 400 in a closed configuration for stripping. FIGS. 7E and 7F show cross-sectional views of a 900 micron coated optical fiber and a 250 micron coated optical fiber, respectively, disposed in the fiber guide channel in preparation to remove the external coatings from these coated optical fibers.

Exemplary optical fiber cleaving device 300 is a bladeless, portable fiber cleaving device that provides suitable tension to permit cleaving of a conventional optical fiber through use of a flexible abrasive material 364 rather than the use of a conventional rigid blade, such as a circular ceramic or tungsten carbide blade. Device 300 includes a base 310 and a cover 330 rotatably connected to the base by a hinge 350. The base can include a work surface 311 defining a reference plane for the device. The cover 330 includes an inside surface 330a that is disposed opposite the base's work surface when the device is in a closed configuration for cleaving a prepared optical fiber. A mandrel 320 is disposed within the base and a shuttle 365 slideably disposed in the cover that holds a flexible abrasive material is disposed in the cover such that it is positioned over the mandrel when the device is in a closed configuration. The flexible abrasive material is configured to contact a prepared optical fiber and create a flaw or nick in a contact zone on a top surface of the prepared optical fiber to initiate a crack which when it propagates through the prepared optical fiber cleaves the prepared optical fiber into two pieces.

One of the key steps in preparing the optical fiber for cleaving is the removal of all of the external polymer coating layers. Thus it is highly advantageous that an optical fiber coating removal device 400 can be incorporated into the base of the optical fiber cleaving device 300, thus, eliminating the need for two separate tools.

Optical fiber coating removal device 400 includes a one piece molded body 410 integrally molded with the base 310 of the optical fiber cleaving device 300. The optical fiber coating removal device has a first body portion 420 connected to a second body 440 portion which is a section of base 310 of optical fiber cleaving device 300, wherein the first body portion is connected to the second body portion by a flexible region 430, and at least a first metal blade 450 secured in the first body portion. The flexible portion allows the first body portions to move relative to the second body portion between an open state and a closed state for stripping the exterior protective coating from an optical fiber.

Device 400 further includes a fiber guide channel 442 formed in the second body portion 440, wherein the fiber guide channel has a first channel wall 442a and a second channel wall 442b disposed opposite the first channel wall. The terminal end of coated optical fiber 10 can be laid in the fiber guide channel in preparation for stripping the exterior polymer coating from the coated optical fiber. The first and second channel walls can have a stepped configuration so that the fiber guide channel is wider at the top of the channel and narrower at the bottom of the channel. Thus the fiber guide channel is characterized by a first channel width near the top of the channel and a second channel width near the bottom of the channel. For example, the first channel width can be about 1.0 mm, which is sufficient to accommodate a 900 micron coated optical fiber while the second channel width can be narrower having a width of about 300 microns to accommodate a 250 micron coated optical fiber.

The dual width fiber guide channel 442 with the stepped sidewalls allows the use of a stripping blade 450 having a first U-shaped slot 453 and a second U-shaped slot 453'. Each of U-shaped slots 453, 453' slot includes cutting edges on the inside edge of the slots that can displace the external coating layer from the terminal end of a coated optical fiber as described previously. In an exemplary aspect, the upper or open ends first and second U-shaped slots have a funnel portion 455, 455' to aid in guiding the coated optical fiber into the U-shaped slots. In another aspect, the cutting edges 454, 454' on the inside edge of the U-shaped slots can be optionally beveled from a first thickness to a second thickness, wherein the first thickness is greater than the second thickness. This beveling of the cutting edges provides a sharper edge for removing the external coating layer from a coated optical fiber.

In an exemplary aspect, blade 450 can have a barb 456 located along each longitudinal edge of the blade 450 to anchor the blade in the first body portion of optical fiber coating removal device 400. In one aspect, the blade can be added to the fiber coating removal device through a conventional insert molding process. In an alternative aspect, blade 450 can be press fit into an opening in the first body portion 420 after the body is formed. Blades 450 can be made of a metal material and can be produced by a simple metal stamping process as described previously.

The width of the U-shaped slots 453, 453' in blade 450 determine which coating layer can be removed. For example, blade 450 can have a first U-shaped slot width of about 300 microns, which can be used to remove the 900 micron coating while leaving the 450 micron coating intact and a second U-shaped slot width of about 165 microns which can be used to remove the 450 micron coating without marring or damaging the bare glass of the optical fiber, as shown in FIGS. 7D-7F.

In an alternative embodiment, the optical fiber coating removal device can include two metal blades disposed side-by side, wherein the first blade has a first U-shaped slot having cutting edges on the inside of the slot and having a first width and a second blade having a second U-shaped slot having cutting edges on the inside of the slot and having a second slot width. In this configuration, the exemplary optical fiber coating removal device will be able to remove a plurality of different polymer coating layers from the terminal end of a coated optical fiber.

The second body portion 440 can have a blade access slot 443 (best seen in FIG. 7B) through the first channel wall 442a and oriented orthogonal to the fiber guide channel 442 through which the blade can extend when the optical fiber coating removal device is actuated to enable removal of the exterior protective coating from the terminal end of the coated optical fiber and a blade counter sink slot 444 formed in the second channel wall 442b and aligned with the fiber access slot to provide the correct positioning of the blade during the coating removal process. The optical fiber coating removal device is actuated by squeezing the first body portion toward the second body portion as indicated by arrow 492 in FIG. 7B.

In an exemplary aspect, the second body portion 440 can further include strip length indicator (not shown) disposed on the work surface 311 of the base 310 of the optical cleaving device 300 adjacent to the fiber guide channel to aid in removing the appropriate amount of coating material from a terminal end of a coated optical fiber. In one aspect, the strip length indicator can be printed on the work surface 311 of the optical cleaving device 300, while in an alternative aspect the strip length indicator can be molded into the work surface 311 of the optical cleaving device 300 when the base of the optical cleaving device is formed.

The exemplary embodiments of the optical fiber coating removal device or stripper described herein can be utilized as a compact, low cost optical fiber coating removal tool suitable for use when terminating factory or field terminable connectors, mechanical splices and fusion splice devices, because the exemplary device does not require specially machined and/or precision milled components. The one piece body of the exemplary optical fiber coating removal device can be made of injection molded plastic and the stamped metal blade keep the manufacturing costs of the optical fiber coating removal device low. In an alternative embodiment such as that shown in FIGS. 7A-7F, exemplary optical fiber coating removal device can be incorporated into other tooling customarily used when terminating optical fibers to reduce the cost and storage space required when the tools are not in use.

Figure 8:
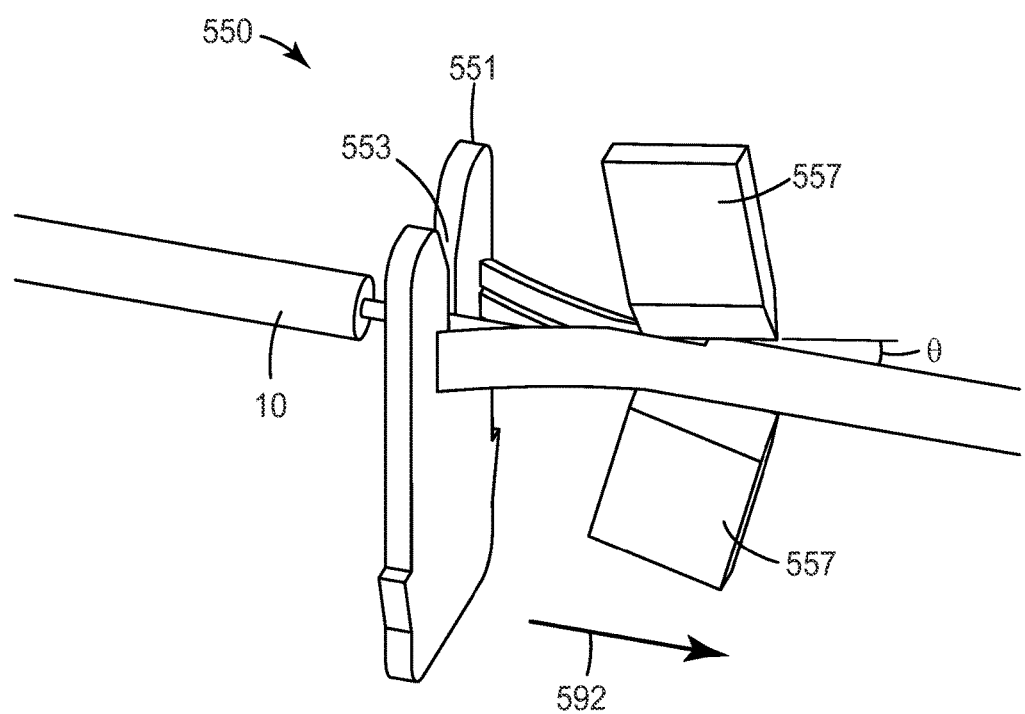
FIG. 8 is a schematic view of an alternative blade system that can be usable in the optical fiber coating removal tool according to an aspect of the invention.

FIG. 8 is a schematic view of an alternative blade system 550 that can be usable in the optical fiber coating removal tool according to an aspect of the invention. The blade system comprises a metal stripping blade 551 having a U-shaped slot as described previously used in combination with at least one coating slitting blade 557. In the exemplary aspect shown in FIG. 8, the exemplary blade system has two coating slitting blades 557 disposed on opposite sides of the coated optical fiber. Each of the coating slitting blades can have a beveled cutting edge to slice through the external coating layer ahead of the stripping blade when the blade system is moved axially along the coated optical fiber as indicated by directional arrow 592.

In an exemplary aspect the slitting blades can be oriented at an angle, θ, with respect to the coated optical fiber. In an exemplary aspect, the slitting blades can be oriented at an angle between about 10° and about 20°. The coating slitting blades can be especially useful when long lengths of the external coating layer needs to be removed.

In an exemplary aspect, the exemplary fiber optic coating removal devices described herein are designed to be inexpensive and disposable. The optic coating removal devices described herein can be utilized as a compact, low cost tool for preparing coated optical fibers for field termination in field terminable connectors, mechanical splices and fusion splice devices. The body of the fiber optic coating removal device can be injection molded as a single plastic keeping manufacturing costs low. The blades can be made via a metal stamping process and either be press fit into an opening in the first body portion of the exemplary device after molding or can be insert molded into the body of the device.

In one exemplary aspect, the exemplary fiber optic coating removal device can be packaged with a preset number of optical fiber connectors or splices allowing the craftsman to simply discard fiber optic coating removal device when he finishes the box of connectors or splices and continue working with a brand new fiber optic coating removal device when he opens a new box of connectors or splices.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. An optical fiber coating removal device, comprising:
   a one piece molded body having a first body portion connected to a second body portion by a flexible portion,
   a first metal blade secured in the first body portion, wherein the first blade includes a first U-shaped slot having cutting edges on the inside of the slot, and
   an open fiber guide channel formed in the second body portion, wherein the fiber guide channel has a first channel wall having a blade access slot extending therethrough and a second channel wall disposed opposite the first channel wall, wherein the first and second channel walls are sloped to create a substantially V-shaped fiber guide channel the facilitates placement of the coated optical fiber in the optical fiber coating removal device,
   wherein the blade is oriented perpendicular the guide channel when the blade extends through the blade access slot, and
   wherein the flexible portion allows the first and second body portions to move between an open state and a closed state for stripping an optical fiber.

2. The device of claim 1, further comprising a blade counter sink slot formed in the second channel wall and aligned with the fiber access slot.

3. The device of claim 1, further comprising strip length indicia formed in the second body portion adjacent to the fiber guide channel to aid in removing the appropriate amount of coating material from a terminal end of an optical fiber.

4. The device of claim 1, wherein the first blade further comprises a second U-shaped slot having cutting edges on the inside of the slot, wherein the first U-shaped slot is characterized by a first width and the second U-shaped slot is characterized by a second width.

5. The device of claim 1, wherein the cutting edges of the first blade are beveled from a first thickness to a second thickness.

6. The device of claim 1, wherein the flexible portion is a living hinge.

7. The device of claim 1, wherein the first metal blade is created by a stamping process and is press fit into an opening in the first body portion.

8. The device of claim 1, wherein the first metal blade is created by a stamping process and is insert molded into the first body portion when the body of the optical fiber coating removal tool is formed.

9. An optical fiber coating removal device incorporated into a base of an optical fiber cleaving device, comprising:

a one piece molded body integrally molded with the base of the optical fiber cleaving device, wherein the one piece molded body includes a first body portion connected to a second body portion which is a section of the base of the optical fiber cleaving device and wherein the first body portion is connected to the second body portion by a flexible region allowing the first body portion to move relative to the second body portion between an open state and a closed state for stripping an external protective coating from a coated optical fiber;

a fiber guide channel formed in the second body portion, wherein the fiber guide channel has a first channel wall having a blade access slot extending therethrough and a second channel wall disposed opposite the first channel wall, wherein the first and second channel walls are sloped to create a substantially V-shaped fiber guide channel the facilitates placement of the coated optical fiber in the optical fiber coating removal device; and at least a first metal blade secured in the first body portion when the blade extends through the blade access slot.

10. The device of claim 9, further comprising a blade counter sink slot formed in the second channel wall and aligned with the fiber access slot.

11. The device of claim 9, further comprising strip length indicia formed on the surface of the base of the optical cleaver to aid in removing the appropriate amount of coating material from a terminal end of an optical fiber.

\* \* \* \* \*